July 3, 1934.    A. M. THOMSEN    1,965,268
USE OF LIME IN PRECIPITATION
Filed Nov. 25, 1929
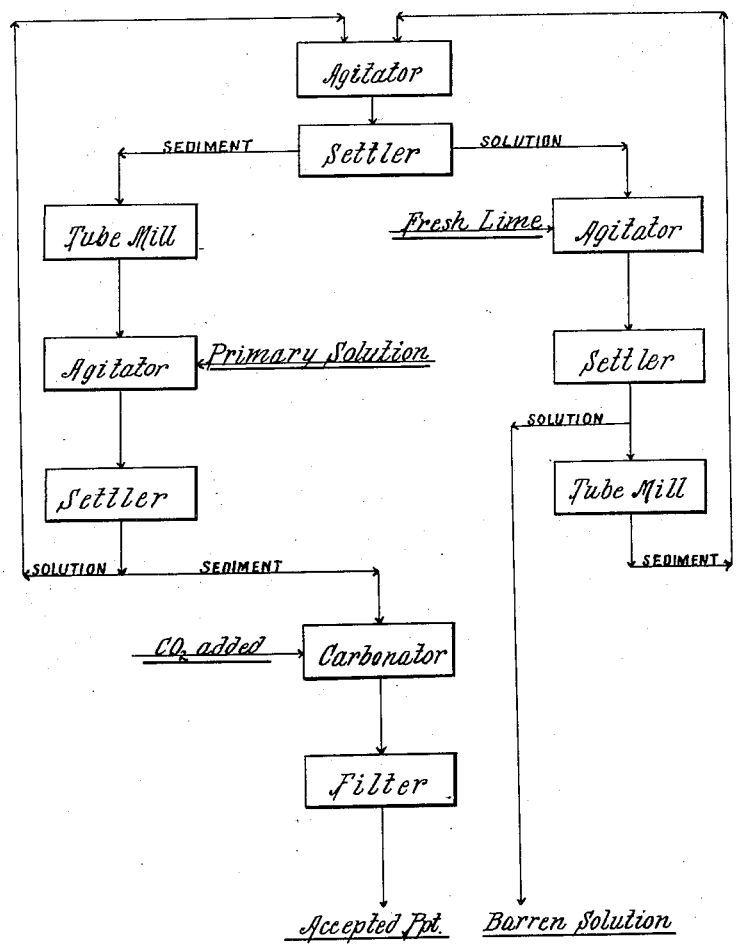

Patented July 3, 1934

1,965,268

UNITED STATES PATENT OFFICE 1,965,268

USE OF LIME IN PRECIPITATION

Alfred M. Thomsen, San Francisco, Calif., assignor to Kohler & Chase, a corporation of California Application November 25, 1929, Serial No. 409,758

1 Claim. (Cl. 23—61)

Owing to the very limited solubility of calcium hydrate in water, it is customary to use a suspension of calcium hydrate in a saturated solution of the same, whenever it is necessary to precipitate a metallic salt from its solution by means of slaked lime. Such a suspension is known either as "milk of lime", or, in greater concentration, as "cream of lime", or, if semi-solid, as lime paste, or "putty". In any event, when added to a solution of the metallic salt which it is desired to precipitate, and kept in suspension by agitation, it soon presents the aspect of a very large number of solid particles of calcium hydrate suspended in the fluid under observation. Theoretically, we may consider that the particles slowly undergo solution in water, and that the hydrate then acts as a precipitant, but in practice we will observe that each particle becomes instantly coated with a gelatinous envelope of precipitated hydroxide surrounding an untouched kernel of solid lime. Through this envelope the reaction still proceeds, but more and more slowly, as the envelope gradually thickens and as the metallic solution decreases in strength.

As time is an essential part of all industrial reactions, we overcome this difficulty by adding an excess of the lime, and this may be anything from 25% to 100% of the calculated requirements. While this solves one difficulty it introduces another, for the precipitate obtained is contaminated with so much lime that it may become unfit for subsequent operations. For this reason lime is rarely employed as a re-agent when the precipitated hydroxide is the object sought,— caustic soda being generally substituted. When we consider that at normal market prices the cost of the soda is seven times as great as its equivalent in lime, we see how desirable it would be to employ the latter re-agent. I have overcome the difficulty in the following manner:—

I accomplish the precipitation in two or more steps, instead of in a single one. Thus: To a tank of solution is added sufficient lime to cause complete precipitation, and the hydroxide separated from the end solution. If this precipitate be now added to a tank of fresh solution, much of its lime will be found to take part in the reaction, and act in place of fresh lime. The purified precipitate is then separated from the solution as before, and either passed on as an accepted product, or else suspended once more in fresh solution. The solution separated from this purified precipitate is then completely precipitated with lime, and the product so obtained passed on to fresh solution,—the spent liquor being discarded.

As an illustration, let us consider that we have a battery of two or more Dorr thickeners, which we are using as a precipitating plant. If fresh solution is permitted to enter continuously at one end, and fresh milk of lime is permitted to enter continuously at the other end, then each intermediate tank will receive the precipitate from the preceding one, and send its solution to a subsequent one. Any other means of separating a precipitate from a solution could manifestly be used in place of the settling action of the Dorr thickeners, which are here used solely as an illustration, and the operation could be conducted either continuously or on a batch basis. The object of the operation is to bring the lime-contaminated precipitate from the final precipitation step into contact with fresh strong solution, so that the lime contained therein may be replaced, as far as possible with the hydroxide of the metal whose solution is undergoing precipitation.

On some metals the step just described will produce a hydroxide substantially free from lime, but on other metals the envelope is too dense, or impervious to permit of the exchange of the metallic bases. In such cases, it is necessary to rupture the envelope by mechanical means, such as attrition, percussion, or both. For instance, if the settled slime from one thickener on its way to the next tank in line be passed through a tube-mill, in that event nearly all the lime kernels will become exposed and capable of fresh reaction. This combination of mechanical disintegration, together with the action of progressively stronger solution, will yield low lime precipitates even from salts of zinc, aluminum, and magnesium.

Another difficulty encountered in the use of lime as a precipitating agent is the gelatinous character of the precipitates produced. This becomes particularly noticeable with the final product, which generally must be washed out and dehydrated. I find that passing carbon dioxide into such a suspended hydroxide results in considerable absorption. Washed chimney gases are quite effective, and readily convert the slimy hydroxides into an easy filtering mixture of complex basic compounds. In cases where dilute gaseous carbon dioxide proves ineffective, the slimy hydroxide may be boiled with a solution of sodium bicarbonate. This is not an expensive operation, as it may readily be rendered cyclic, thus: the filtrate from the easy-filtering precipitate produced by boiling the hydroxide with sodium bi-carbonate is cooled, and sent down a scrubber tower against an ascending current of washed chimney gases. The bi-carbonate is thus reformed and may be used again indefinitely.

My improvements in the use of lime may therefore be divided into three steps, thus:

1. Saving lime and improving the grade of the precipitate by conducting the operation in several steps, and bringing the lime-contaminated precipitate from the final step in contact repeatedly with fresh strong solution or solutions.

2. Activating the lime contained in the precipitate by passing it through a tube-mill, or similar machine, while it is being passed forward through the steps described under "1".

3. Making the final precipitate more manageable, either by passing carbon dioxide into a suspension of the same, or by boiling it with sodium bicarbonate.

I claim:

In the process of precipitating a solution of a metallic salt by means of lime, the method consisting of dividing the operation into a series of steps, whereby the precipitate produced, consisting of a mixture of metallic hydrate and unused lime, is progresively brought into contact with fresher and stronger solutions, re-activating the lime in said precipitate by submitting it to a grinding operation as it is passed from step to step, until the lime content of said precipitate has been reduced to the predetermined limit, and passing carbon dioxide into a suspension of said precipitate.

ALFRED M. THOMSEN.